United States Patent
Pascal et al.

(10) Patent No.: US 10,474,943 B2
(45) Date of Patent: Nov. 12, 2019

(54) RUGGEDIZED RADIO FREQUENCY IDENTIFICATION TAGS

(71) Applicant: Parker-Hannifin Corporation, Cleveland, OH (US)

(72) Inventors: Kevin Pascal, Lexington, KY (US); Mason Morehead, Signal Mountain, TN (US); James Upshur, Moore, SC (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 16/072,551

(22) PCT Filed: Jan. 20, 2017

(86) PCT No.: PCT/US2017/014265
§ 371 (c)(1),
(2) Date: Jul. 25, 2018

(87) PCT Pub. No.: WO2017/136154
PCT Pub. Date: Aug. 10, 2017

(65) Prior Publication Data
US 2019/0034778 A1    Jan. 31, 2019

Related U.S. Application Data

(60) Provisional application No. 62/291,182, filed on Feb. 4, 2016.

(51) Int. Cl.
*G06K 19/06*    (2006.01)
*G06K 19/077*    (2006.01)
(Continued)

(52) U.S. Cl.
CPC ..... *G06K 19/07728* (2013.01); *G06K 19/025* (2013.01); *G06K 19/07773* (2013.01); *H01Q 1/2208* (2013.01)

(58) Field of Classification Search
CPC ........... G06K 19/025; G06K 19/07728; G06K 19/07773; H01Q 1/2208
See application file for complete search history.

(56) References Cited

U.S. PATENT DOCUMENTS

| | | | |
|---|---|---|---|
| 6,286,736 B1 * | 9/2001 | Angus | A45C 1/04 224/236 |
| 6,759,968 B2 | 7/2004 | Zierolf | |

(Continued)

FOREIGN PATENT DOCUMENTS

| WO | WO 2012104765 | 8/2012 |
|---|---|---|
| WO | WO 2015073964 | 5/2015 |

OTHER PUBLICATIONS

International Search Report and Written Opinion of PCT/US2017/014265 dated Mar. 24, 2017, 9 pages.

*Primary Examiner* — Thien M Le
(74) *Attorney, Agent, or Firm* — Renner, Otto, Boisselle & Sklar, LLP

(57) ABSTRACT

A method of manufacturing a radio frequency identification (RFID) tag assembly (10) includes: forming an elastomeric body (12) made of an elastomeric material; providing an RFID tag (14); forming a patch (16) made of an elastomeric material; locating the RFID tag on a surface of the elastomeric body; overlaying the patch onto the RFID tag to cover the RFID tag with the patch; and bonding the patch to the elastomeric body, wherein the RFID tag is embedded within elastomeric material encompassed by the elastomeric body and the patch that overlays the RFID tag. The patch may be formed by die cutting the patch from the same elastomeric material component that is used to form the elastomeric body. The patch alternatively is formed separately from the elastomeric body from a dedicated source of elastomeric (Continued)

material, or formed by overlapping and bonding two ends of the elastomeric body to overlay the RFID tag embedded between the two ends.

9 Claims, 10 Drawing Sheets

(51) Int. Cl.
*G06K 19/02* (2006.01)
*H01Q 1/22* (2006.01)

(56) References Cited

U.S. PATENT DOCUMENTS

| | | | |
|---|---|---|---|
| 7,158,034 B2 | 1/2007 | Corbett, Jr. | |
| 7,213,767 B2 | 5/2007 | Tethrake et al. | |
| 8,282,013 B2 | 10/2012 | Stewart et al. | |
| 8,740,090 B2 | 6/2014 | Casden | |
| 8,777,112 B2 | 7/2014 | Mieslinger | |
| 8,826,972 B2 | 9/2014 | Flint et al. | |
| 9,950,575 B2* | 4/2018 | Marques | B60C 23/0483 |
| 2005/0215294 A1* | 9/2005 | Eisenhower, Jr. | G01D 5/485 455/575.1 |
| 2007/0008121 A1 | 1/2007 | Hasrt | |
| 2010/0079286 A1 | 4/2010 | Phaneuf | |
| 2011/0273860 A1* | 11/2011 | Corvese | B41J 3/36 361/816 |
| 2013/0285829 A1 | 10/2013 | Pacheco et al. | |
| 2014/0001708 A1 | 1/2014 | Ewing et al. | |
| 2015/0087477 A1* | 3/2015 | Herold | A63B 71/0686 482/3 |
| 2015/0151515 A1* | 6/2015 | Skepton | A45C 11/00 428/43 |
| 2015/0189770 A1* | 7/2015 | Loop | G06Q 10/0833 312/223.1 |
| 2015/0363685 A1* | 12/2015 | Teng | G06K 19/07718 156/250 |
| 2017/0059435 A1* | 3/2017 | Marques | B60C 23/0483 |

* cited by examiner

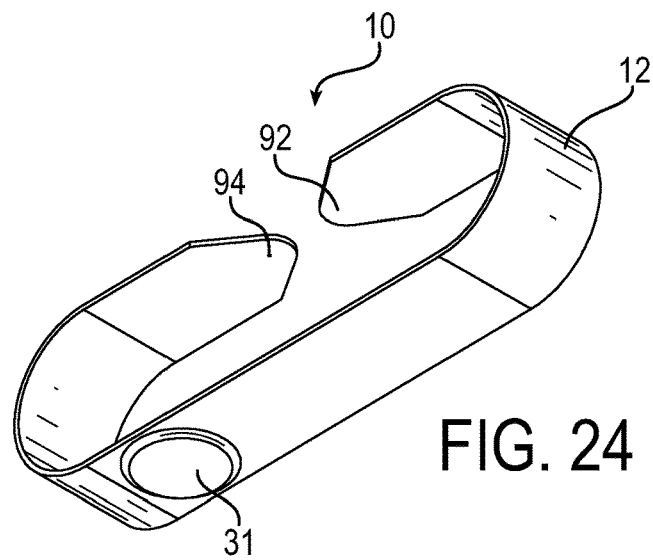
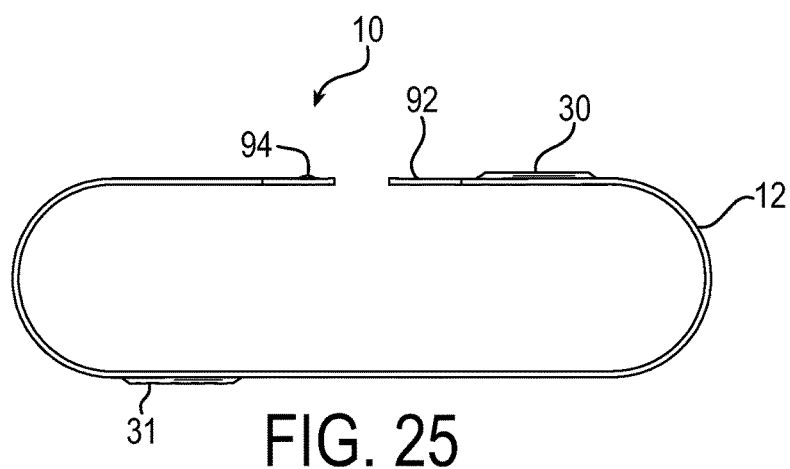
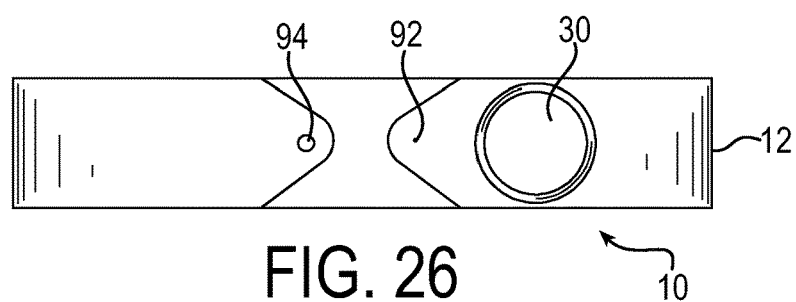

RUGGEDIZED RADIO FREQUENCY IDENTIFICATION TAGS

RELATED APPLICATIONS

This application is a national stage application pursuant to 35 U.S.C. § 371 of PCT/US2017/014265 filed on Jan. 20, 2017, which claims the benefit of U.S. Provisional Application No. 62/291,182 filed Feb. 4, 2016, which are incorporated herein by reference.

FIELD OF INVENTION

The present invention relates to configurations and methods of manufacturing of radio frequency identification (RFID) tag assemblies that may be used for electronic identification and tracking of articles of manufacture.

BACKGROUND

Radio frequency identification (RFID) tags are well known for electronic identification and tracking of items. A variety of industries, such as retail establishments, warehousing, shipping, inventory systems, product and component maintenance and tracking systems, and many others, employ RFID tags for electronic identification and tracking of items as they proceed through such systems.

RFID systems may be passive or active. In a passive RFID system, an RFID tag may contain small integrated circuitry embedded within the tag. The tag circuitry may function both as a radio receiver and transmitter, as well as an electronic data storage medium, and a tuned conductor which acts as an antenna. In passive systems, energy from the reader energizes the circuitry in the tag, which in turn emits a signal that may be read by the reader. The signal may then be associated with component or item information that may be stored in the tag circuitry itself, and/or in a remote database. In an active RFID system, the tag additionally may have an onboard power source to boost performance.

In typical examples, the RFID tag may be fixed onto an outer surface of the tagged article with any suitable type of bonding. The tag, therefore, may be exposed to the environment. As the tags are generally relatively thin sheets of material, tags are easily worn and damaged by adverse environmental conditions. The metal tag base and embedded circuitry are thus fragile, which can result in frequent need to replace the tags.

Applicant's commonly owned U.S. Pat. No. 8,282,013 (Stewart et al., issued Oct. 9, 2012) teaches to provide a ruggedized RFID tag in the context of a sealing element, such as an o-ring or other geometric closed-shape elastomeric sealing element. In the '013 patent, the RFID tag or transponder is embedded within the elastomeric material of the sealing element, particularly during a molding process for manufacturing the sealing element. The method disclosed in the '013 patent generally includes inserting one or more tags or transponders into a preformed sealing element, and then subjecting the preformed sealing element to additional processing such as heat compression or other molding to form the final sealing element. The '013 patent is particularly suitable for RFID systems, as the electronic signals of the tag and reader can pass through the sealing material.

In the '013 patent, the tag typically is associated with information pertaining to the sealing element itself, and not to the broader article into which the sealing element is used. In many systems, it may be desirable to have tags associated with information pertaining to both a generalized article and components thereof, and to have a tag assembly that can be readily removed, reprogrammed, and replaced onto the same or a different article or component. The methods of the '013 patent, therefore, constitute improvements over conventional attempts to ruggedize an RFID tag, but there remains additional need to improve over the various conventional RFID tagging systems.

SUMMARY OF INVENTION

The present invention is a ruggedized RFID tag assembly containing an RFID tag, with the RFID tag assembly being easily attached and if necessary removed from an article requiring electronic identification or tracking. The RFID tag assembly includes one or more RFID tags or inlays, also referred to as a transponder, that is embedded inside of a base elastomeric body to create a highly robust and ruggedized RFID tag assembly.

The base elastomeric body may be configured in the form of a geometric open-shape or closed-shape configuration, such as for example a solid or hollow continuous toroid or other closed shape (rectangular, square, etc.) when in the free state, or a linear or ribbon open configuration. Any suitable shaped configuration and any cross-section of elastomeric body may be employed as warranted for any particular application. Other embodiments may employ a discontinuous elastomeric body, which may be mechanically or chemically joined to create a generally closed-shape form to help facilitate repeated attachment and/or removal from an article. The elastomeric body may be flexible and/or stretchable so that the RFID tag assembly may be banded around an article requiring electronic identification or tracking. The elastomeric body may be conventionally molded, extruded and cut, or otherwise formed of an elastomeric material which specifically may be selected for low or high temperature performance, flexibility, pressure resistance, or otherwise for compatibility with the environment as may be warranted for any particular usage.

An RFID tag is then located on a surface of the elastomeric body at the desired location. A patch of elastomeric material is then formed, and the patch is fixed to the elastomeric body by a molding process or other suitable bonding process so as to cover the tag. As a result, the tag becomes embedded within elastomeric material encompassed by the base elastomeric body and the over-covering patch.

In an exemplary embodiment, the patch may be formed by die cutting the patch from the same elastomeric material that is used to form the elastomeric body, essentially therefore forming the patch and the elastomeric body from the same portion or component of elastomeric material. Once cut, the patch is overlaid onto the tag and sealed by molding or otherwise bonding the patch to the elastomeric body to form the completed RFID tag assembly. In another exemplary embodiment, the patch may be formed separately from the elastomeric body by molding the patch from a separate or distinct dedicated source component of elastomeric material. Once separately formed, as above the patch is overlaid onto the tag and sealed by molding or otherwise bonding the patch to the elastomeric body to form the completed RFID tag assembly. In another exemplary embodiment, the patch may be formed by overlapping ends of an initial ribbon or linear base elastomeric body to form a closed-shape RFID tag assembly. In this embodiment, the tag becomes embedded within the elastomeric body between the overlapping ends, which are sealed together by the molding or other bonding process with one of the overlapping ends effectively functioning as the over-covering patch.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

FIG. 24 is a drawing depicting an isometric view of another exemplary RFID tag assembly, including a separately molded patch with a snap fastening system, in accordance with embodiments of the present invention.

FIG. 25 is a drawing depicting a top cross-sectional view of the exemplary RFID tag assembly of FIG. 24.

FIG. 26 is a drawing depicting a side view of the exemplary RFID tag assembly of FIG. 24.

DETAILED DESCRIPTION

Figure 1:
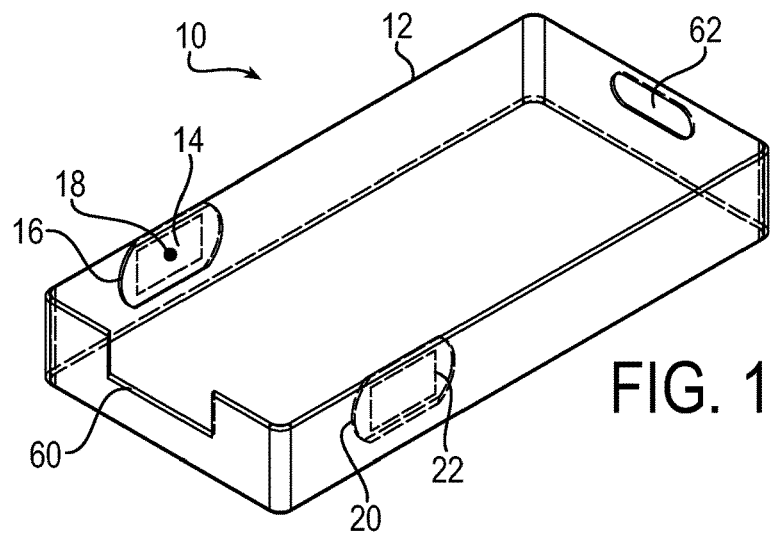
FIG. 1 is a drawing depicting an isometric view of an exemplary RFID tag assembly in accordance with embodiments of the present invention.

Embodiments of the present invention will now be described with reference to the drawings, wherein like reference numerals are used to refer to like elements throughout. It will be understood that the figures are not necessarily to scale.

The present invention pertains to a ruggedized RFID tag assembly containing an RFID tag, with the RFID tag assembly being easily attached and if necessary removed from an article requiring electronic identification or tracking. The RFID tag assembly includes one or more bare RFID tags or inlays, also referred to as a transponder, that is embedded inside elastomeric material to create a highly robust and ruggedized RFID tag assembly.

A base elastomeric body may be in the form of a geometric open-shape or closed-shape configuration, such as for example a solid or hollow continuous toroid or other closed shape (rectangular, square, or other closed "ring" type structure) when in the free state, or a linear or ribbon open configuration. Any suitable shaped configuration and any cross-section of elastomeric body may be employed as warranted for any particular application. It will be appreciated that aspects of the present invention may find utility in other configurations having circumferences or perimeters of other regular or irregular geometries, or in linear or rectilinear, or curvilinear or otherwise actuate open geometries such as strips of any lengths. Similarly, the cross sectional profile of the elastomeric body may take alternative geometric forms that are semicircular, i.e., D-shaped, elliptical, or otherwise actuate, polygonal, i.e., square, rectangular, or trapezoidal, lobed, i.e., X- or M-shaped, or other regular or irregular geometric shaped cross-sections. Use within those such other shapes and lengths therefore should be considered to be within the scope of the present invention.

In certain circumstances, it may also be of use to form the elastomeric body using a plurality of discontinuous elastomeric body components. Such body components may then be mechanically or chemically joined to create a generally round or other closed-shape form of the elastomeric body to help facilitate repeated attachment and/or removal from an article. Examples of mechanical joining include snaps, latches, interference friction fits, and the like. Examples of chemical joining include adhesives, vulcanization, and the like. The elastomeric body may be conventionally molded, extruded and cut, or otherwise formed of an elastomeric material which specifically may be selected for low or high temperature performance, flexibility, pressure resistance, or having other properties for compatibility with the environment associated with any particular usage.

The elastomeric body that forms most of the assembly may be flexible and/or stretchable so that the RFID tag assembly may be banded around an article requiring electronic identification or tracking. By providing a flexible or stretchable configuration that can be banded around an article (similarly to a rubber band), the RFID tag assembly can be readily removed, reprogrammed with new information associated with the RFID tag, and replaced onto the same or a different article or component. Suitable materials, which may be filled, for example, with glass or carbon black, or which may be unfilled, include natural rubbers such as Hevea and thermoplastic, i.e., melt-processible, or thermosetting, i.e., vulcanizable, synthetic rubbers such as: fluoro- or perfluoroelastomers, chlorosulfonate, polybutadiene, butyl, neoprene, nitrile, polyisoprene, buna-N, copolymer rubbers such as ethylene-propylene (EPR), ethylene-propylene-diene monomer (EPDM), acrylonitrile-butadiene (NBR or HNBR) and styrene-butadiene (SBR), and blends such as ethylene or propylene-EPDM, EPR, or NBR. The term "synthetic rubbers" also should be understood to encompass materials which alternatively may be classified broadly as thermoplastic or thermosetting elastomers such as polyurethanes, silicones, fluorosilicones, styrene-isoprene-styrene (SIS), and styrene-butadiene-styrene (SBS), as well as other polymers which exhibit rubber-like properties such as plasticized nylons, polyolefins, polyesters, ethylene vinyl acetates, fluoropolymers, and polyvinyl chloride. As used herein, the term "elastomeric" is ascribed its conventional meaning of exhibiting rubber-like properties of compliancy, resiliency or compression deflection, low compression set, flexibility, and an ability to recover after deformation, i.e., stress relaxation.

Different iterations of the RFID tag assembly may utilize different elastomeric bodies pigmented to various colors to provide a rapid visual means of identifying the RFID tag assembly, and thus any article to which the assembly is attached. This feature is beneficial in facilitating human-machine interaction. Similarly, the RFID assembly may be marked by ink, laser, or similar means, with other human readable identifiers such as alphanumeric text or graphics. Examples of this include barcodes, QR codes, basic instructions, part numbers, logos, and the like.

The RFID tag or transponder that is utilized in the RFID tag assembly may include an onboard chip, which may function both as a radio receiver and transmitter, as well as an electronic data storage medium, and a tuned conductor, which acts as an antenna. The transponder may be provided based on any available technology including, for example, UHF, HF, LF, or NFC frequencies and may be either passive or active type tags are known in the art. In a preferred embodiment, the RFID tag assembly utilizes passive UHF or NFC tags. As it may be so provided, such transponder requires neither an internal power source which would need replacement, nor an external power source or other component which would require hardwire or other connections extending out of the body that could interfere with the function of the invention. The transponder thus may be completely encapsulated within the elastomeric material and thereafter need not be removed.

For convenience of illustration, this description commonly describes the RFID tag assembly in connection with the use of one tag or transponder. It will be appreciated, however, that the RFID tag assembly may include multiple tags or transponders embedded within the elastomeric material using comparable principles. All such variations are within the scope of the invention.

Figure 2:
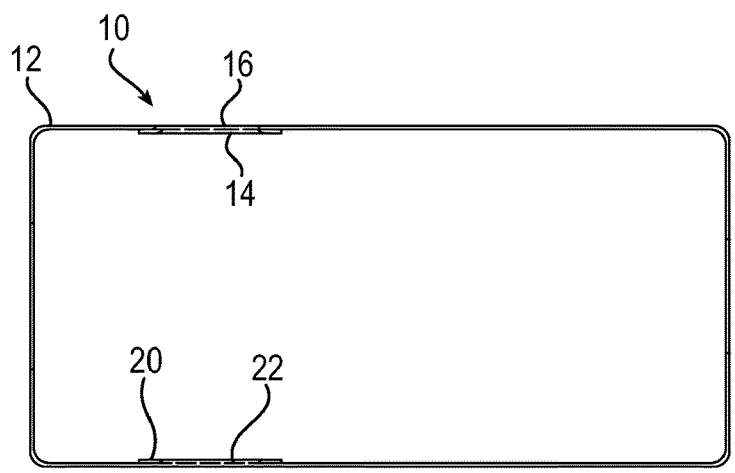
FIG. 2 is a drawing depicting a top cross-sectional view of the exemplary RFID tag assembly of FIG. 1.
Figure 3:
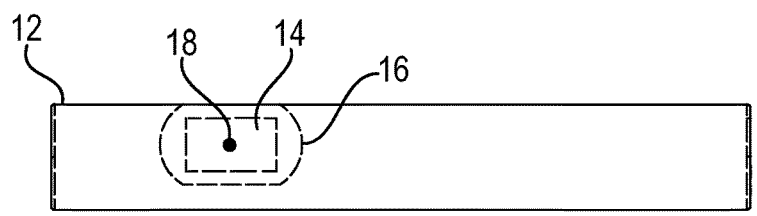
FIG. 3 is a drawing depicting a side view of the exemplary RFID tag assembly of FIG. 1.

FIG. 1 is a drawing depicting an isometric view of an exemplary RFID tag assembly 10 in accordance with embodiments of the present invention. FIG. 2 is a drawing depicting a top cross-sectional view of the exemplary RFID tag assembly 10 of FIG. 1. FIG. 3 is a drawing depicting a side view of the exemplary RFID tag 10 assembly of FIG. 1.

The RFID tag assembly 10 includes a base elastomeric body 12, an RFID tag or transponder 14, and an elastomeric patch 16. In the illustrated embodiment, the elastomeric body and resultant assembly have a closed-shape, generally rectangular configuration. Such a configuration may be particularly suitable for banding around a commensurately shaped rectangular article. The RFID tag 14 may be coded for information pertaining to such article as part of an article electronic identification and tracking system. As referenced above, the general shape and cross-section of the elastomeric body may be configured in any matter as warranted for a particular application depending upon the configuration of the related article, and may also include open shaped configurations.

The RFID tag 14 may include circuitry represented generally by reference numeral 18, the circuitry having the characteristics described above. The patch 16 may be made of an elastomeric material that may have the same composition or comparable material properties as the elastomeric material of the elastomeric body 12. The RFID tag 14 may be located on a surface of the elastomeric body, and the patch 16 is then overlaid on the RFID tag 14 so as to completely cover the RFID tag 14. The patch may be fixed to the elastomeric body by a molding process or other suitable bonding process so as to cover the tag. As a result, the tag becomes embedded within elastomeric material encompassed by the base elastomeric body 12 and the over-covering patch 16. This is shown by the dash lined in FIG. 1 indicating that the RFID tag 14 is located internally within the assembly. The top cross-sectional view of FIG. 2 further shows how the RFID tag 14 is embedded within the elastomeric material of the elastomeric body 12 and the patch 16.

In the illustrated example of FIGS. 1-3, the RFID tag 14 has a generally rectangular shape, and the patch 16 has a more ovular shape with rounded corners. Any other suitable shapes may be employed within the scope of the invention. The area of the patch, as shown in the figures, should exceed the area of the RFID tag so that the patch completely encompasses the RFID tag in the resultant assembly. Such configuration, therefore, provides a ruggedized tag assembly with the RFID tag being completely encompassed within the elastomeric material of the combined base elastomeric body 12 and patch 16. The RFID tag, therefore, is isolated and protected from environmental exposure that could otherwise damage the tag. The nature of the elastomeric material still permits electronic communication between the RFID tag circuitry 18 and a suitable tag reader even with the RFID tag 14 being completely embedded with elastomeric material.

The rounded nature of the patch further has advantages in avoiding the use of sharp corners, which would have a greater propensity for peeling from the elastomeric body.

In the illustrated example of FIGS. 1-3, with the elastomeric body 12 being formed into a closed-shape rectangular structure, the RFID tag 14 and patch 16 are located on an inner surface of the elastomeric body 12. As such, the inner surface thickness of the elastomeric body in the area of the tag slightly extends inwardly due to the patch thickness, as shown particularly in FIG. 2. In an alternative embodiment, the RFID tag and patch may be located on an outer surface of the elastomeric body, in which case the outer surface thickness of the of the elastomeric body would extend slightly outwardly due to the patch thickness.

In addition, the illustrated example of FIGS. 1-3 shows the use of a second patch 20 that overlays a second RFID tag 22. As referenced above, any number of RFID tags may be used as warranted for a particular application. Multiple tags may be used to identify and track a common article, for example if the article may change positions such that a certain tag is easier to read at times as compared to other tags, and vice versa. Additionally or alternatively, an article associated with RFID tags may be a multi-component article. In such case, multiple RFID tags may be associated respectively with the broader article and different components of the article. In this manner, an RFID tag assembly may employ multiple tags so as to identify and track both the article itself and various components of the article.

The present invention provides for methods of manufacturing an RFID tag assembly, including an RFID tag embedded within elastomeric material encompassed by a base elastomeric body and an over-covering patch that overlays the RFID tag. Although the exemplary manufacturing methods are described below as a specific order of executing functional logic steps, the order of executing the steps may be changed relative to the order described. Also, two or more steps described in succession may be executed concurrently or with partial concurrence. It is understood that all such variations are within the scope of the present invention. In general, embodiments of the manufacturing methods include the steps of: (1) forming an elastomeric body made of an elastomeric material; (2) providing an RFID tag; (3) forming a patch made of an elastomeric material (which may be the same or different from the elastomeric material of the elastomeric body); (3) locating the RFID tag on a surface of the elastomeric body (which may be either an inner or outer surface of the elastomeric body having a closed-shape configuration); (4) overlaying the patch onto the RFID tag to cover the RFID tag with the patch; and (5) bonding the patch to the elastomeric body, wherein the RFID tag is embedded within elastomeric material encompassed by the elastomeric body and the patch that overlays the RFID tag.

As referenced above, the elastomeric body may be conventionally molded, extruded and cut, or otherwise formed of an elastomeric material by any suitable processing as is known in the art. Similarly, the patch may be bonded to the elastomeric body by a similar molding process, compression bonding, heat curing, adhesive bonding, or any other suitable bonding processes as are known in the art.

The present invention encompasses various methods for forming the patch made of elastomeric material. In an exemplary embodiment, the patch may be formed by die cutting the patch from the same elastomeric material that is used to form the elastomeric body. In this embodiment, therefore, the patch is formed from the same component or portion of elastomeric material component as the elastomeric body. As a result, the elastomeric material of the patch and elastomeric body are of the same composition. Once cut, the patch is overlaid onto the RFID tag as referenced above and sealed by bonding the patch to the elastomeric body to form the completed RFID tag assembly with the RFID tag completely embedded within the elastomeric material.

In another exemplary embodiment, the patch may be formed separately from the elastomeric body, such as by molding or otherwise forming the patch from a separate or distinct dedicated source component of elastomeric material. When the patch is formed separately from the elastomeric body using a separate dedicated source component of elastomeric material, the patch may or may not have the same material composition as the elastomeric body. The patch, however, should still have material properties that are compatible with effective bonding to the elastomeric body, and material properties that otherwise are compatible (flexibility, stretchability, resistances, etc.) with the desired usage of the RFID tag assembly. Once separately molded or otherwise formed, similarly as above the patch is overlaid onto the RFID tag and sealed by bonding the patch to the elastomeric body to form the completed RFID tag assembly with the RFID tag completely embedded within the elastomeric material of the patch and elastomeric body.

Figure 4:
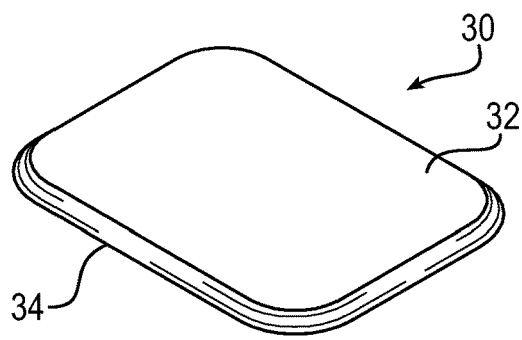
FIG. 4 is a drawing depicting an isometric view of an exemplary patch for use in an RFID tag assembly in accordance with embodiments of the present invention.
Figure 5:
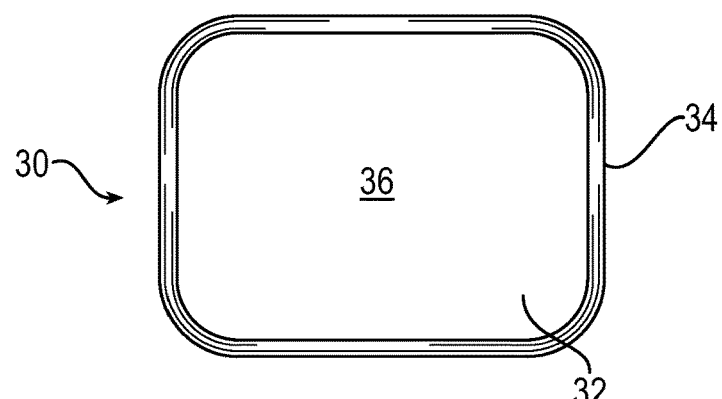
FIG. 5 is a drawing depicting a top view of the exemplary patch of FIG. 4.

Molding or otherwise forming the patch separately from the elastomeric body has an advantage over die cutting the patch from a common material component used to form the elastomeric body, in that a separately molded patch can be optimally shaped by the patch molding process for any particular usage. FIG. 4 is a drawing depicting an isometric view of an exemplary patch 30 for use in an RFID tag assembly in accordance with embodiments of the present invention. FIG. 5 is a drawing depicting a top view of the exemplary patch 30 of FIG. 4, and FIG. 6 is a drawing depicting a side view of the exemplary patch 30 of FIG. 4.

Figure 6:
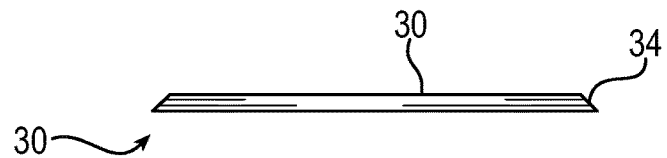
FIG. 6 is a drawing depicting a side view of the exemplary patch of FIG. 4.

In the example of FIGS. 4-6, the patch 30 has a main portion 32 and chamfer surface 34 that extends in an angled orientation from the main portion 32. As shown in this example, the chamfer surface 34 may extend around an entire perimeter of the main portion 32 of the patch. The angle of orientation as shown may be approximately 45°, although the angle of orientation may be varied as may be suitable for any particular application. Although an RFID tag is relatively thin, it does have a measurable thickness. By providing the chamfer surface 34 in a third dimension in a plane away from a plane of the main portion 32, a recess 36 is defined by the patch 30 that accommodates the thickness of the RFID tag. This provides for a more effective bonding of the patch to the elastomeric body when the paid is overlaid onto the RFID tag. The chamfer surface 34 is readily formed when the patch is made using a molding process separately from forming the elastomeric body. It would be substantially more difficult to shape the patch in such manner when the patch is formed by die cutting the patch from the same elastomeric material component that is used to form the elastomeric body.

Figure 7:
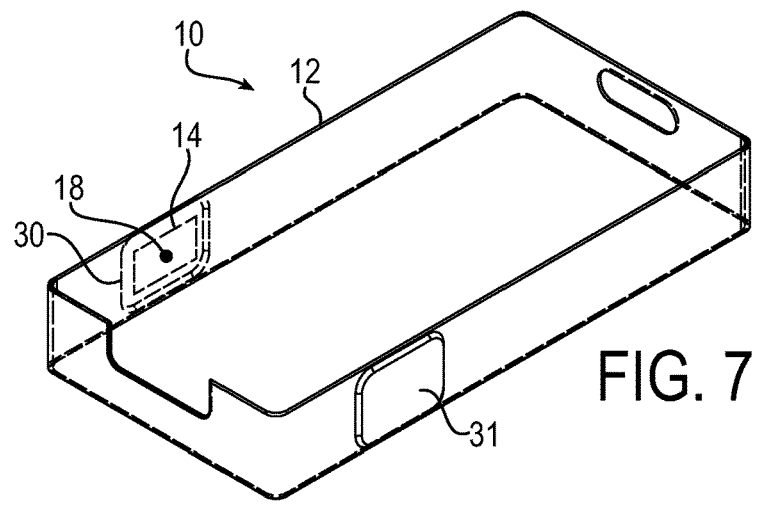
FIG. 7 is a drawing depicting an isometric view of another exemplary RFID tag assembly, including a separately molded patch, in accordance with embodiments of the present invention.
Figure 8:
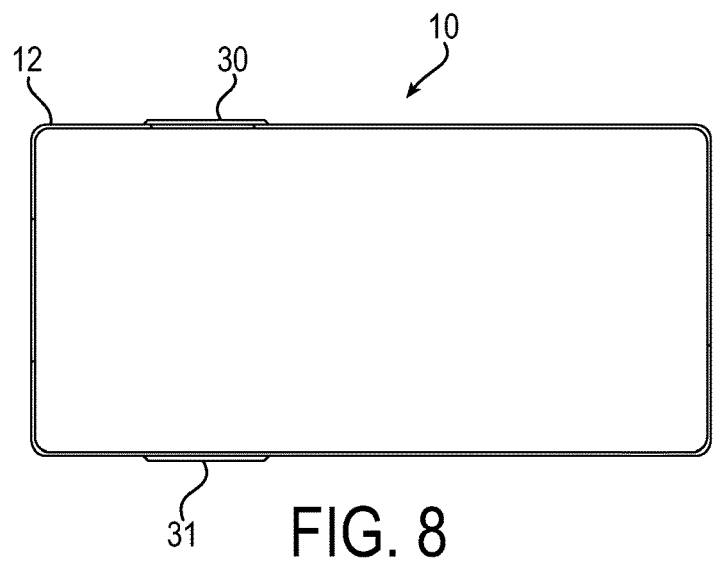
FIG. 8 is a drawing depicting a top cross-sectional view of the exemplary RFID tag assembly of FIG. 7.
Figure 9:
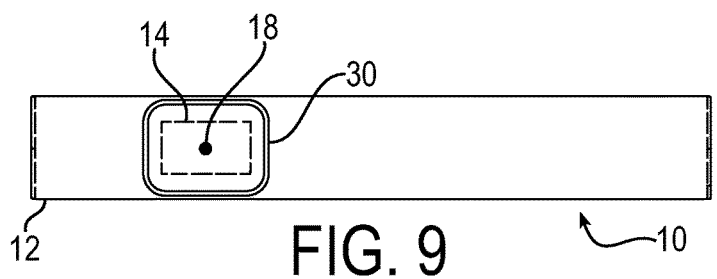
FIG. 9 is a drawing depicting a side view of the exemplary RFID tag assembly of FIG. 7.

FIG. 7 is a drawing depicting an isometric view of another exemplary RFID tag assembly 10, including a separately molded patch 30, in accordance with embodiments of the present invention. FIG. 8 is a drawing depicting a top cross-sectional view of the exemplary RFID tag assembly of FIG. 7. FIG. 9 is a drawing depicting a side view of the exemplary RFID tag assembly of FIG. 7.

In other words, the embodiment of FIGS. 7-9 is similar to that of FIGS. 1-3, except the molded patch 30 of FIGS. 4-6 is incorporated into the assembly. For a dual patch configuration, a second and comparable molded patch 31 may encompass another RFID tag assembly in like manner, and as referenced above any number of RFID tag assemblies and respective molded patches may be employed as warranted for any particular application. In addition, in the example of FIGS. 7-9, the patch and RFID tag are provided on an outer surface of the elastomeric body 12, illustrating the point above that the RFID tag and patch may be bonded to either inner or outer surfaces of the elastomeric body.

In the previous examples, the tag is described as being located on the elastomeric body, with the patch then being overlaid on the tag. In an alternative embodiment, using comparable manufacturing processes the tag first may be embedded within the patch itself, and then the assembly of the patch and embedded tag may be bonded to the elastomeric body as a unit. A method of manufacturing a radio frequency identification (RFID) tag assembly, therefore, may include the steps of: forming an elastomeric body made of an elastomeric material; providing an RFID tag; forming a patch made of an elastomeric material; embedding the RFID tag within the patch; and bonding the patch with the embedded RFID tag to the elastomeric body.

Figure 10:
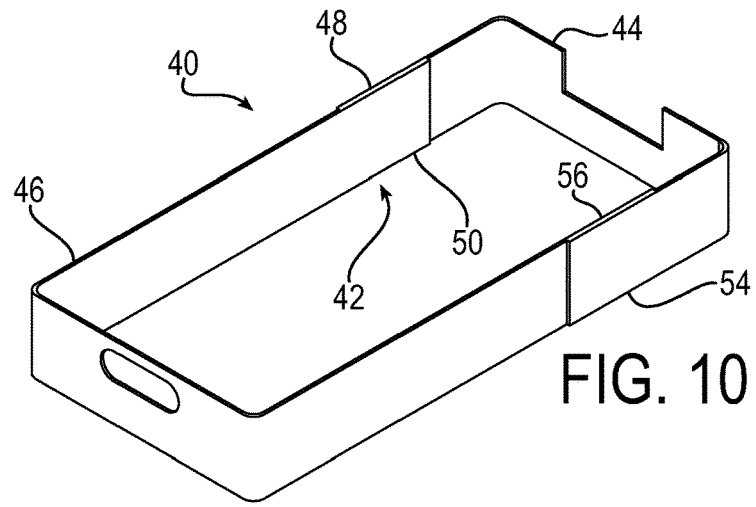
FIG. 10 is a drawing depicting an isometric view of another exemplary RFID tag assembly, including a patch formed by overlapping ends of an elastomeric body, in accordance with embodiments of the present invention.
Figure 11:
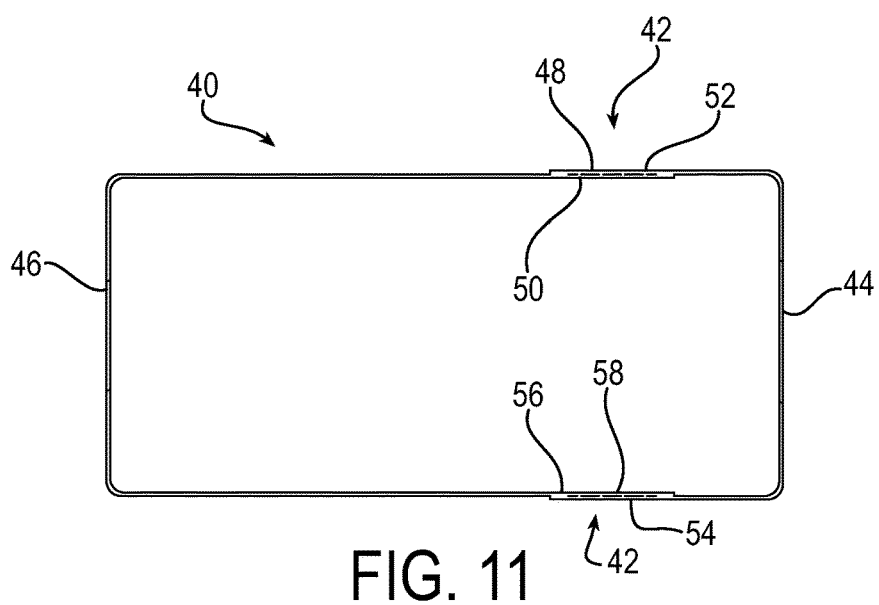
FIG. 11 is a drawing depicting a top cross-sectional view of the exemplary RFID tag assembly of FIG. 10.
Figure 12:
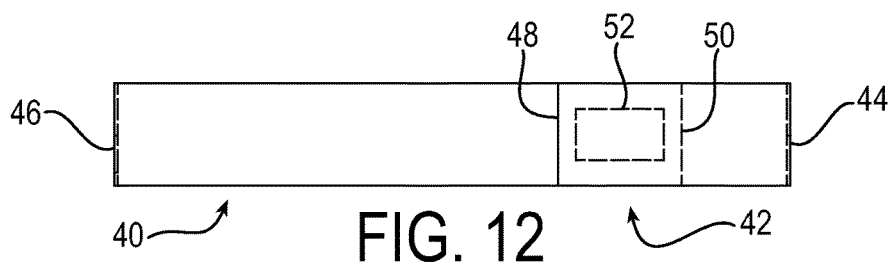
FIG. 12 is a drawing depicting a side view of the exemplary RFID tag assembly of FIG. 10.

In another exemplary embodiment, the patch may be formed by overlapping opposite free ends of an initial ribbon or linear base elastomeric body to form the RFID tag assembly. FIG. 10 is a drawing depicting an isometric view of another exemplary RFID tag assembly 40, including a patch 42 formed by overlapping ends of an elastomeric body, in accordance with embodiments of the present invention. FIG. 11 is a drawing depicting a top cross-sectional view of the exemplary RFID tag assembly of FIG. 10. FIG. 12 is a drawing depicting a side view of the exemplary RFID tag assembly of FIG. 10.

In the example of FIGS. 10-12, an elastomeric body initially may be formed of multiple pieces 44 and 46 with the resultant elastomeric body having at least two free opposing first and second ends 48 and 50 of elastomeric material in an initial state (or as a singular component having only the two free ends 48 and 50 in the initial state), which then may be joined and bonded in an overlapping fashion to form a closed-shape configuration. In such embodiment, an RFID tag 52 is located on a surface of the elastomeric body adjacent to a first end 48 (or the second end 50, vice versa) of the elastomeric body. The first and second ends 48 and 50 are then moved relative to each other into an overlapping position, thereby overlaying the RFID tag 52 to form the patch 42. By relative movement, it is contemplated that any movement of the first and second ends into the overlapping position may be performed (e.g., the second end may be moved with the first end being stationary, or vice versa, or both ends may be moved relative to each other, into the overlapping position). The second end of the elastomeric body is then bonded to the first end of the elastomeric body in the overlapping position. As a result, the RFID tag 52 becomes embedded within the elastomeric material between the bonded and overlapping first and second ends 48 and 50 of the elastomeric body, which are sealed together by the molding or other bonding process to form the completed RFID tag assembly with the RFID tag completely embedded within the elastomeric material of the bonded first and second ends of the elastomeric body.

Similarly to the embodiments of FIGS. 1 and 7, the embodiment of FIGS. 10-12 shows an example using two RFID tags. As indicated above, pieces 44 and 46 of the elastomeric body in this example initially are wholly separate pieces. Accordingly, a second pair of opposing ends 54 and 56 may be provided and bonded in an overlapping position in like manner as ends 48 and 50. The bonded ends in this manner may embed between the overlapping ends a second RFID tag 58 (see FIG. 11). In similar fashion, the elastomeric body may be provided in any number of pieces, with free ends of adjacent pieces generally being overlapped and bonded to form patches for embedding a corresponding number of RFID tags. In a single tag configuration, the pieces 44 and 46 could rather be formed as a combined single open structure in the initial state with only the two free ends 48 and 50, the two free ends then being bonded together in the overlapping position as described above.

In a variation of this embodiment, instead of merely bonding ends of the elastomeric body components together, two concentric or otherwise congruent (i.e., commensurate non-circular) bands of elastomeric body material may be provided. The tags then may be sandwiched between to the two bands. A method of manufacturing a radio frequency identification (RFID) tag assembly, therefore, may include the steps of: forming a first band component of an elastomeric body made of an elastomeric material; forming a second band component of the elastomeric body made of the elastomeric material, the second band component being shaped congruently with the first band component; providing an RFID tag; locating the FRID tag between the first and second band components; and bonding the first band component and the second band component together to form the elastomeric body, wherein the RFID tag is embedded within elastomeric material encompassed by the elastomeric body between the bonded first band component and second band component.

The elastomeric body further may be shaped during its forming process to have one or more positioning features. The positioning features may aid in aligning, proper positioning, and/or or securing the RFID tag assembly when the assembly is banded around or otherwise secured to the article requiring electronic identification or tracking. Referring again back to FIG. 1, in the illustrated example the elastomeric body may include a cutaway 60. The cutaway 60 may be configured as a notch that accommodates a component extension that needs to extend beyond the RFID tag assembly when the assembly is banded around or otherwise secured to the article requiring electronic identification or tracking. The component extension by be a portion of the tagged article itself, or may be another component or connection element that extends from the article. A differently configured positioning feature 62 is shown in the example of FIG. 1, which is configured as an ovular shaped cutout from the elastomeric body. The ovular cutout 42 may be extended over a commensurately shaped component of or attached to the article, thereby aiding in securing the RFID tag assembly to the article.

Figure 13:
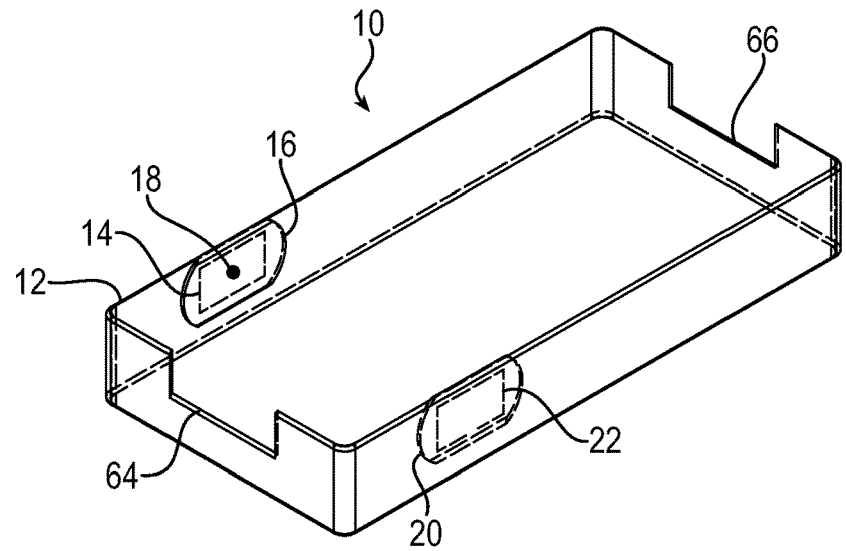
FIG. 13 is a drawing depicting an isometric view of another exemplary RFID tag assembly in accordance with embodiments of the present invention, with notched positioning features.
Figure 14:
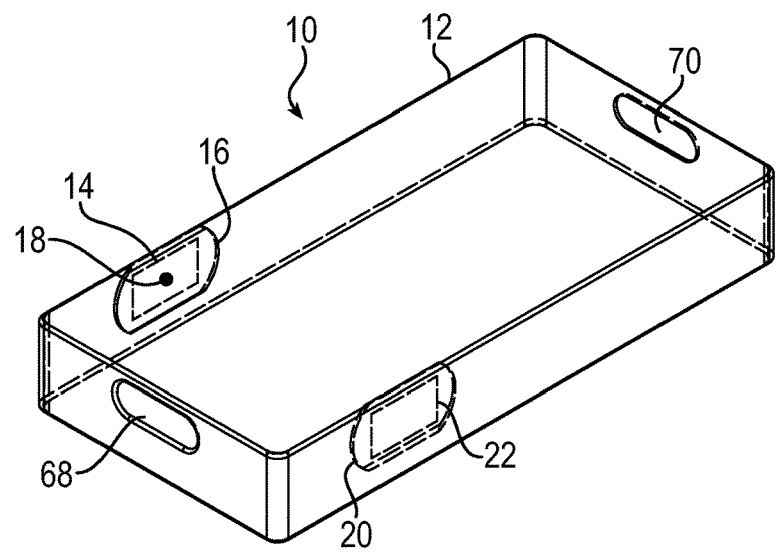
FIG. 14 is a drawing depicting an isometric view of another exemplary RFID tag assembly in accordance with embodiments of the present invention, with cutaway positioning features.

It will be appreciated that the shapes, dimensions, and other configuration characteristics of the positioning features may be varied widely as may be suitable for accommodating any shaped or configured article requiring electronic identification or tracking. For example, FIG. 13 is a drawing depicting an isometric view of a variation of the exemplary RFID tag assembly 10 in accordance with embodiments of the present invention. In the example of FIG. 13, the positioning features are configured as a dual notch configuration having notches 64 and 66 cut away from opposite sides of the elastomeric body 12, which can accommodate commensurately shaped extensions from or connections to opposite sides of an article. FIG. 14 is a drawing depicting an isometric view of another variation of the RFID tag assembly 10 in accordance with embodiments of the present invention. In the example of FIG. 14, the positioning features are configured as a dual ovular cutout configuration having ovular cutouts 68 and 70 cut away from opposite sides of the elastomeric body 12, which likewise can accommodate commensurately shaped extensions from or connections to opposite sides of an article. Again, it will be appreciated that the configurations of the positioning features of FIGS. 1, 13, and 14 are examples, and the positioning features may be configured and customized in any suitable manner as may be warranted for a given application including an article requiring electronic identification or tracking. In addition, positioning features may be variedly provides on other configurations of RFID tag assembly, such as the configurations of FIGS. 7 and 10, or any other similarly configured RFID tag assembly.

The various methods may be expanded to provide an RFID tag assembly having multiple RFID tags embedded within the elastomeric body. Such a method of manufacturing an RFID assembly may include the steps of providing a plurality of RFID tags; forming a patch made of an elastomeric material for each of the RFID tags using any of the embodiments of the patch forming processes; locating the RFID tags on a surface of the elastomeric body; overlaying the patches respectively onto corresponding RFID tags to cover the RFID tags with the patches; and bonding the patches to the elastomeric body, wherein the RFID tags are embedded within elastomeric material encompassed by the elastomeric body and the patches that respectively overlay the RFID tags.

As referenced above, the elastomeric body that forms most of the assembly may be flexible and/or stretchable so that the RFID tag assembly may be banded around an article requiring electronic identification or tracking. By providing a flexible or stretchable configuration that can be banded around an article (similarly to a rubber band), the RFID tag assembly can be readily removed, reprogrammed with new information associated with the RFID tag, and replaced onto the same or a different article or component. The presence of customized positioning features aids in the removal and effective replacement of the RFID tag assembly for sequential usages on comparably configured articles.

The remaining figures provide additional fastening mechanisms that can aid or enhance flexible banding of the RFID tag assembly around an article requiring electronic identification or tracking. The subsequent embodiments are similar to FIGS. 7-9, in that separate patches 30 and/or 31 are bonded to the elastomeric material. In the specific examples of the subsequent figures, the patch is circular in shape, because as referenced above any suitable patch shape may be employed. Accordingly, like reference numerals are used in the subsequent figures as in FIGS. 7-9.

Figure 15:
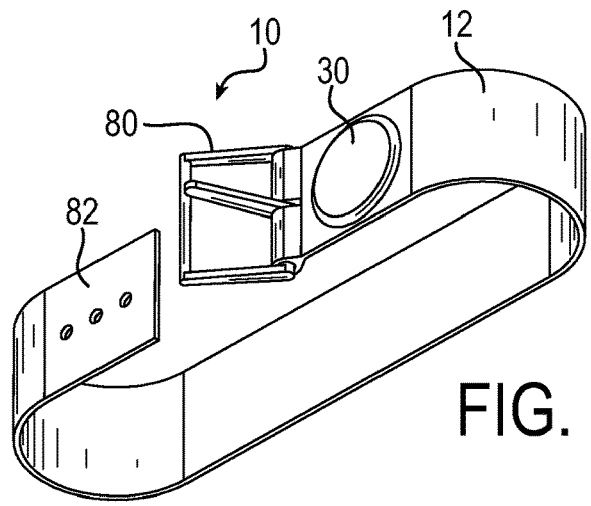
FIG. 15 is a drawing depicting an isometric view of another exemplary RFID tag assembly, including a separately molded patch with a belt fastening system, in accordance with embodiments of the present invention.
Figure 16:
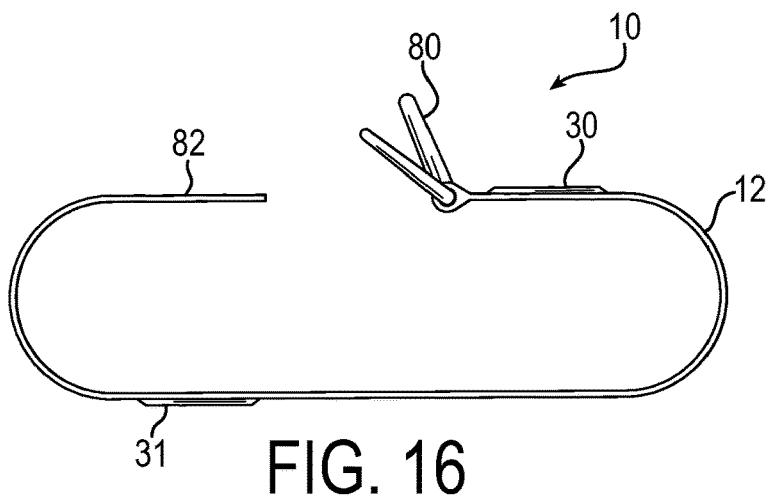
FIG. 16 is a drawing depicting a top cross-sectional view of the exemplary RFID tag assembly of FIG. 15.
Figure 17:
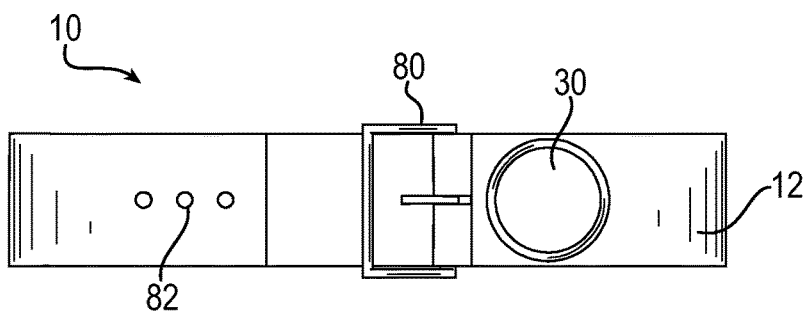
FIG. 17 is a drawing depicting a side view of the exemplary RFID tag assembly of FIG. 15.

FIG. 15 is a drawing depicting an isometric view of another exemplary RFID tag assembly 10, including a separately molded patch 30 with a belt fastening system, in accordance with embodiments of the present invention. FIG. 16 is a drawing depicting a top cross-sectional view of the exemplary RFID tag assembly of FIG. 15. FIG. 17 is a drawing depicting a side view of the exemplary RFID tag assembly of FIG. 15. For a dual patch configuration as in previous embodiments, a second and comparable molded patch 31 (see the top cross-sectional view of FIG. 16) may encompass another RFID tag assembly in like manner, and as referenced above any number of RFID tag assemblies and respective molded patches may be employed as warranted for any particular application. In addition, in the example of FIGS. 15-17, the patch and RFID tag are provided on an outer surface of the elastomeric body 12, illustrating the point above that the RFID tag and patch may be bonded to either inner or outer surfaces of the elastomeric body.

In the embodiment of FIGS. 15-17, a belt fastening system may be employed to enhance the versatility of banding of the RFID tag assembly around an article requiring electronic identification or tracking. The belt fastening system may include a belt buckle 80 at a first end of the elastomeric body 12, and a holed end 82 at an opposing second end of the elastomeric body. The belt fastening system can be used to adjust the overall size of the assembly.

Figure 18:
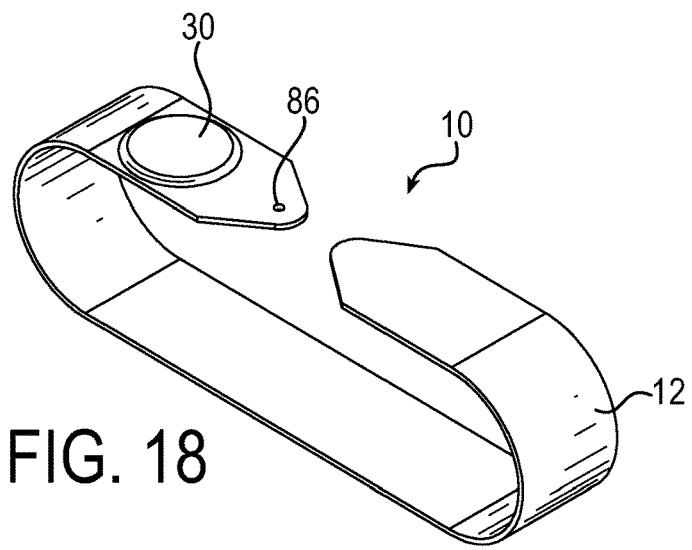
FIG. 18 is a drawing depicting an isometric view of another exemplary RFID tag assembly, including a separately molded patch with a post fastening system, in accordance with embodiments of the present invention.
Figure 19:
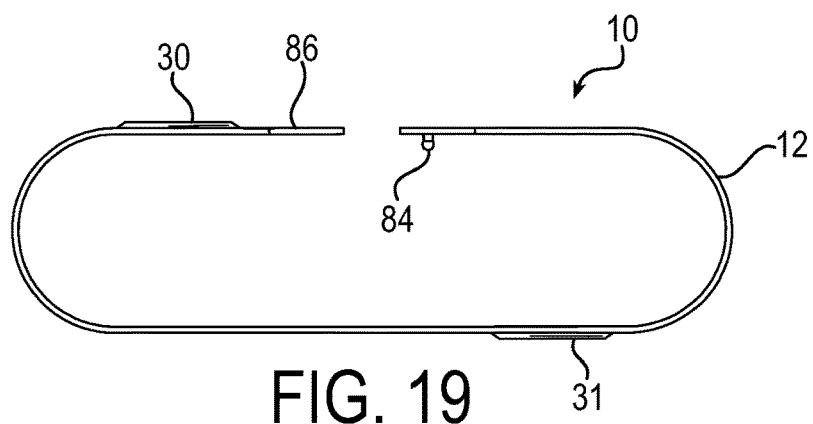
FIG. 19 is a drawing depicting a top cross-sectional view of the exemplary RFID tag assembly of FIG. 18.
Figure 20:
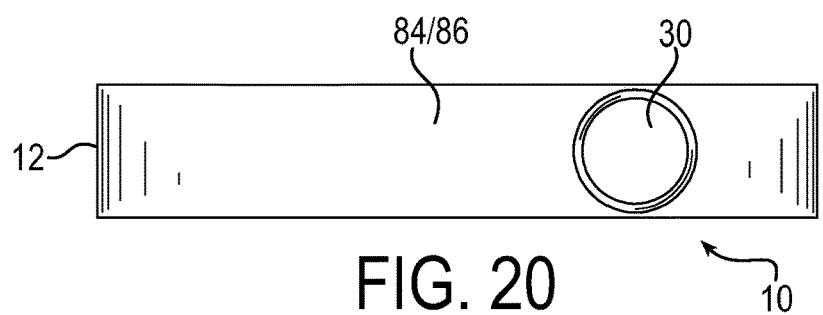
FIG. 20 is a drawing depicting a side view of the exemplary RFID tag assembly of FIG. 18.

Other configurations of fastening systems may be employed. In the embodiment of FIGS. 18-20, a post fastening system may be employed to enhance the versatility of banding of the RFID tag assembly around an article requiring electronic identification or tracking. The post fastening system may include a post 84 at a first end of the elastomeric body 12, and a holed end 86 at an opposing second end of the elastomeric body having one or more holes for receiving the post. The holes for the post fastening system can positioned as desired to adjust the overall size of the assembly.

Figure 21:
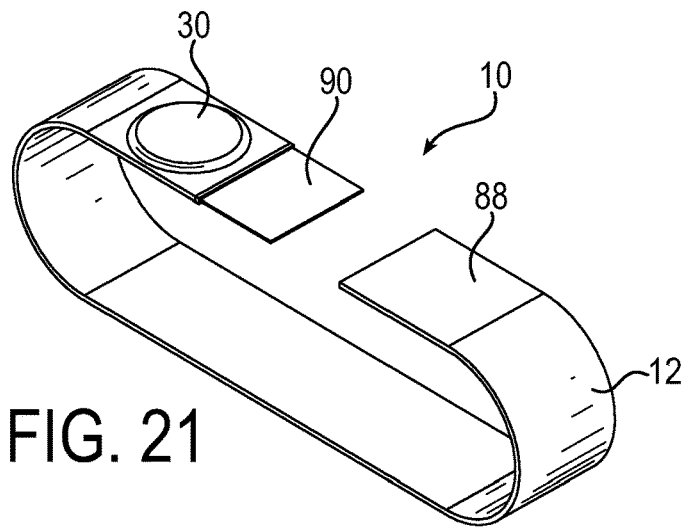
FIG. 21 is a drawing depicting an isometric view of another exemplary RFID tag assembly, including a separately molded patch with a press fit fastening system, in accordance with embodiments of the present invention.
Figure 22:
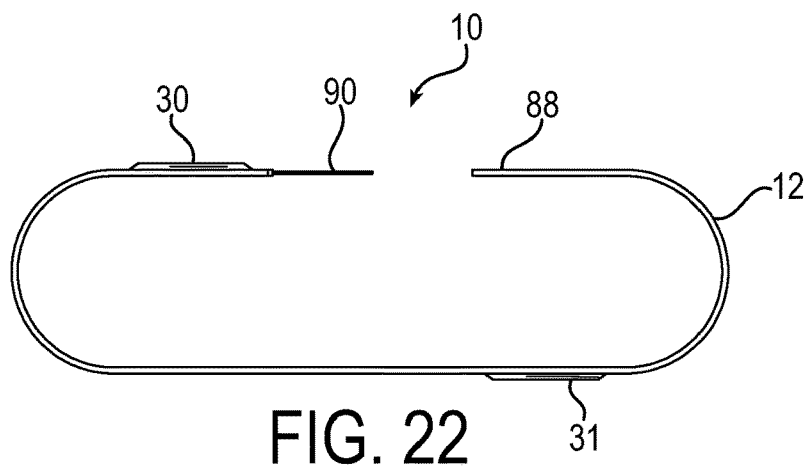
FIG. 22 is a drawing depicting a top cross-sectional view of the exemplary RFID tag assembly of FIG. 21.
Figure 23:
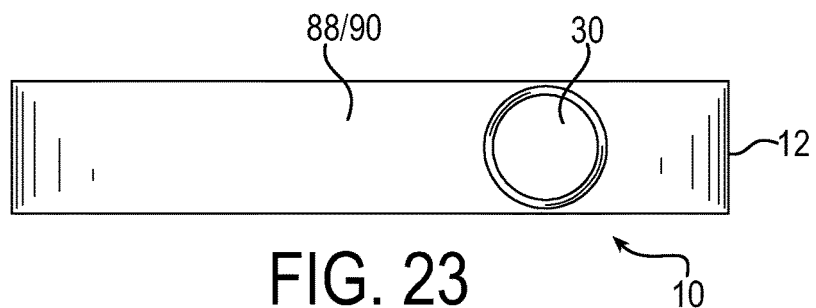
FIG. 23 is a drawing depicting a side view of the exemplary RFID tag assembly of FIG. 22.

In the embodiment of FIGS. 21-23, a press fit fastening system may be employed to enhance the versatility of banding of the RFID tag assembly around an article requiring electronic identification or tracking. The press fit fastening system may include first component 88 at a first end of the elastomeric body 12, and a second component 90 at an opposing second end of the elastomeric body, that can be press fit together for joining the two ends. The press fit components can be sized as suitable for any particular application to adjust the overall size of the assembly.

In the embodiment of FIGS. 24-26, a snap fastening system may be employed to enhance the versatility of banding of the RFID tag assembly around an article requiring electronic identification or tracking. The snap fastening system may include a first snap component 92 at a first end of the elastomeric body 12, and a second snap component 94 at an opposing second end of the elastomeric body, which can be snapped together for joining the two ends. The snap components can be positioned as suitable for any particular application to adjust the overall size of the assembly.

Figure 27:
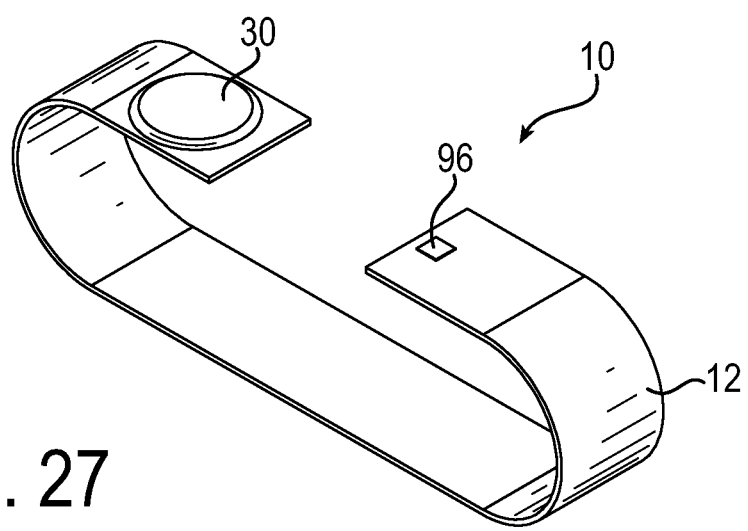
FIG. 27 is a drawing depicting an isometric view of another exemplary RFID tag assembly, including a separately molded patch with a hook-loop fastening system, in accordance with embodiments of the present invention.
Figure 28:
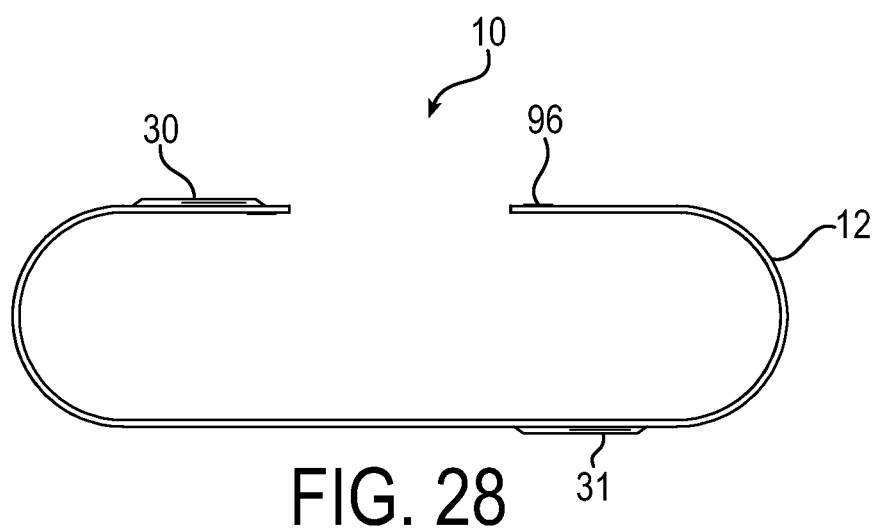
FIG. 28 is a drawing depicting a top cross-sectional view of the exemplary RFID tag assembly of FIG. 27.

In the embodiment of FIGS. 27-28, a hook-loop fastening system (e.g., VELCRO®) may be employed to enhance the versatility of banding of the RFID tag assembly around an article requiring electronic identification or tracking. The hook-loop fastening system may include a hoop component 96 at a first end of the elastomeric body 12, which can mechanically fasten to the elastomeric body in a hook-loop type connection for joining the two ends. The hook component can be positioned and sized as suitable for any particular application to adjust the overall size of the assembly.

An aspect of the invention, therefore, is a method of manufacturing a radio frequency identification (RFID) tag assembly. In exemplary embodiments, the manufacturing method may include the steps of: forming an elastomeric body made of an elastomeric material; providing an RFID tag; forming a patch made of an elastomeric material; locating the RFID tag on a surface of the elastomeric body; overlaying the patch onto the RFID tag to cover the RFID tag with the patch; and bonding the patch to the elastomeric body, wherein the RFID tag is embedded within elastomeric material encompassed by the elastomeric body and the patch that overlays the RFID tag. The manufacturing method may include one or more of the following features, either individually or in combination.

In an exemplary embodiment of the manufacturing method, forming the patch comprises die cutting the patch from the same elastomeric material component that is used to form the elastomeric body.

In an exemplary embodiment of the manufacturing method, forming the patch comprises forming the patch separately from the elastomeric body from a dedicated source component of elastomeric material.

In an exemplary embodiment of the manufacturing method, the patch has a material composition that is different from a material composition of the elastomeric body.

In an exemplary embodiment of the manufacturing method, the patch has a material composition that is the same as a material composition of the elastomeric body.

In an exemplary embodiment of the manufacturing method, forming the patch comprises molding the patch to include a chamfer surface that extends in an angled orientation from a main portion of the patch.

In an exemplary embodiment of the manufacturing method, the angle of orientation is about 45°.

In an exemplary embodiment of the manufacturing method, a first end of the elastomeric body is joined to a second end of the elastomeric body using a belt fastening mechanism.

In an exemplary embodiment of the manufacturing method, a first end of the elastomeric body is joined to a second end of the elastomeric body using a post fastening mechanism.

In an exemplary embodiment of the manufacturing method, a first end of the elastomeric body is joined to a second end of the elastomeric body using a press fit fastening mechanism.

In an exemplary embodiment of the manufacturing method, a first end of the elastomeric body is joined to a second end of the elastomeric body using a snap fastening mechanism.

In an exemplary embodiment of the manufacturing method, a first end of the elastomeric body is joined to a second end of the elastomeric body using a hook-loop fastening mechanism.

In an exemplary embodiment of the manufacturing method: the elastomeric body is formed to have a first end and a second end opposite to the first end; the RFID tag is located on a surface of the elastomeric body adjacent to the first end; forming the patch comprises moving the first and second ends of the elastomeric body into an overlapping position, thereby overlaying the RFID tag to form the patch; and bonding the second end to the first end in the overlapping position, wherein the RFID tag becomes embedded within the elastomeric material between bonded first and second ends.

In an exemplary embodiment of the manufacturing method, the elastomeric body is configured to have a closed-shaped configuration, and the RFID tag is located on an inner surface of the elastomeric body.

In an exemplary embodiment of the manufacturing method, the elastomeric body is configured to have a closed-shaped configuration, and the RFID tag is located on an outer surface of the elastomeric body.

In an exemplary embodiment of the manufacturing method, the elastomeric body comprises a plurality of discontinuous components that are mechanically or chemically joined to form the closed-shape configuration.

In an exemplary embodiment of the manufacturing method, the elastomeric body is configured to have an open-shape configuration.

In an exemplary embodiment of the manufacturing method, the elastomeric body is formed by one of a molding process, or an extrusion and cutting process.

In an exemplary embodiment of the manufacturing method, the patch is bonded to the elastomeric body by one of a molding process, compression bonding, heat curing, or an adhesive bonding.

In an exemplary embodiment of the manufacturing method, the method further includes forming one or more positioning features in the elastomeric body.

In an exemplary embodiment of the manufacturing method, the positioning features comprise a plurality of notches or cutaways formed in the elastomeric body.

In an exemplary embodiment of the manufacturing method the method includes: providing a plurality of RFID tags; forming a patch made of an elastomeric material for each of the RFID tags; locating the RFID tags on a surface of the elastomeric body; overlaying the patches respectively onto corresponding RFID tags to cover the RFID tags with the patches; and bonding the patches to the elastomeric body, wherein the RFID tags are embedded within elastomeric material encompassed by the elastomeric body and the patches that respectively overlay the RFID tags.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of manufacturing a radio frequency identification (RFID) tag assembly comprising the steps of:
    forming an elastomeric body made of an elastomeric material;
    providing an RFID tag;
    forming a patch made of an elastomeric material;
    locating the RFID tag on a surface of the elastomeric body;
    overlaying the patch onto the RFID tag to cover the RFID tag with the patch; and
    bonding the patch to the elastomeric body, wherein the RFID tag is embedded within elastomeric material encompassed by the elastomeric body and the patch that overlays the RFID tag;
    wherein:
    the elastomeric body is formed to have a first end and a second end opposite to the first end;
    the RFID tag is located on a surface of the elastomeric body adjacent to the first end;
    forming the patch comprises moving the first and second ends of the elastomeric body into an overlapping position, thereby overlaying the RFID tag to form the patch; and bonding the second end to the first end in the overlapping position, wherein the RFID tag becomes embedded within the elastomeric material between bonded first and second ends.

2. The manufacturing method of claim 1, wherein the elastomeric body is configured to have a closed-shaped configuration, and the RFID tag is located on an inner surface of the elastomeric body.

3. The manufacturing method of claim 1, wherein the elastomeric body is configured to have a closed-shaped configuration, and the RFID tag is located on an outer surface of the elastomeric body.

4. The manufacturing method of claim 3, wherein the elastomeric body comprises a plurality of discontinuous components that are mechanically or chemically joined to form the closed-shape configuration.

5. The manufacturing method of claim 1, wherein the elastomeric body is configured to have an open-shape configuration.

6. The manufacturing method of claim 1, further comprising forming one or more positioning features in the elastomeric body.

7. The manufacturing method of claim 6, wherein the positioning features comprise a plurality of notches or cutaways formed in the elastomeric body.

8. A method of manufacturing a radio frequency identification (RFID) tag assembly comprising the steps of:
forming an elastomeric body made of an elastomeric material;
providing a plurality of RFID tags;
forming a patch made of an elastomeric material for each of the RFID tags;
locating the RFID tags on a surface of the elastomeric body;
overlaying the patches respectively onto corresponding RFID tags to cover the RFID tags with the patches; and
bonding the patches to the elastomeric body, wherein the RFID tags are embedded within elastomeric material encompassed by the elastomeric body and the patches that respectively overlay the RFID tags.

9. A method of manufacturing a radio frequency identification (RFID) tag assembly comprising the steps of:
forming a first band component of an elastomeric body made of an elastomeric material;
forming a second band component of the elastomeric body made of the elastomeric material, the second band component being shaped congruently with the first band component;
providing an RFID tag;
locating the FRID tag between the first and second band components; and
bonding the first band component and the second band component together to form the elastomeric body, wherein the RFID tag is embedded within elastomeric material encompassed by the elastomeric body between the bonded first band component and second band component.

* * * * *